United States Patent [19]

Magee

[11] Patent Number: 4,696,325

[45] Date of Patent: Sep. 29, 1987

[54] SENSING OF FIRE INSTALLATION WATER VALVES BEING CLOSED

[76] Inventor: Anthony J. Magee, 1 Curdies Street, East Bentleigh, Victoria 3165, Australia

[21] Appl. No.: 847,655

[22] PCT Filed: Jul. 18, 1985

[86] PCT No.: PCT/AU85/00156

§ 371 Date: Mar. 6, 1986

§ 102(e) Date: Mar. 6, 1986

[87] PCT Pub. No.: WO86/00970

PCT Pub. Date: Feb. 13, 1986

[30] Foreign Application Priority Data

Jul. 18, 1984 [AU] Australia .............................. PG6074
Sep. 4, 1984 [AU] Australia .............................. PG6928

[51] Int. Cl.⁴ ............................................. F16K 37/00
[52] U.S. Cl. ..................................... 137/552; 137/554
[58] Field of Search ...................... 137/554, 551, 552; 200/81.9 M

[56] References Cited

U.S. PATENT DOCUMENTS

| | | | |
|---|---|---|---|
| 1,456,149 | 5/1923 | Renshaw | 346/17 |
| 2,365,907 | 12/1944 | Rider | 137/551 X |
| 3,522,596 | 8/1970 | Fowler et al. | 137/554 |
| 3,538,948 | 11/1970 | Nelson | 137/554 |
| 3,719,203 | 3/1973 | Wettre | 137/554 |
| 3,859,619 | 1/1975 | Ishihara et al. | 137/554 |
| 4,093,000 | 6/1978 | Poff | 137/554 |

FOREIGN PATENT DOCUMENTS

| | | |
|---|---|---|
| 0051961 | 5/1982 | European Pat. Off. . |
| 2146456 | 3/1972 | Fed. Rep. of Germany . |
| 3331013 | 3/1984 | Fed. Rep. of Germany . |
| 1586381 | 2/1970 | France . |
| 1364030 | 8/1974 | United Kingdom . |
| 500407 | 4/1976 | U.S.S.R. . |

Primary Examiner—Alan Cohan
Assistant Examiner—John A. Rivell
Attorney, Agent, or Firm—Merchant, Gould, Smith, Edell, Welter & Schmidt

[57] ABSTRACT

An improved water supply valve for a fire installation where water is to be supplied through the valve in the event of fire. The valve includes a sensor external of the valve chamber which can magnetically sense the gate of the valve being closed and being useable to provide an alarm activating output signal. The sensor is connectable to a fire installation to give an alarm indication in response to the output signal when the gate is closed.

6 Claims, 9 Drawing Figures

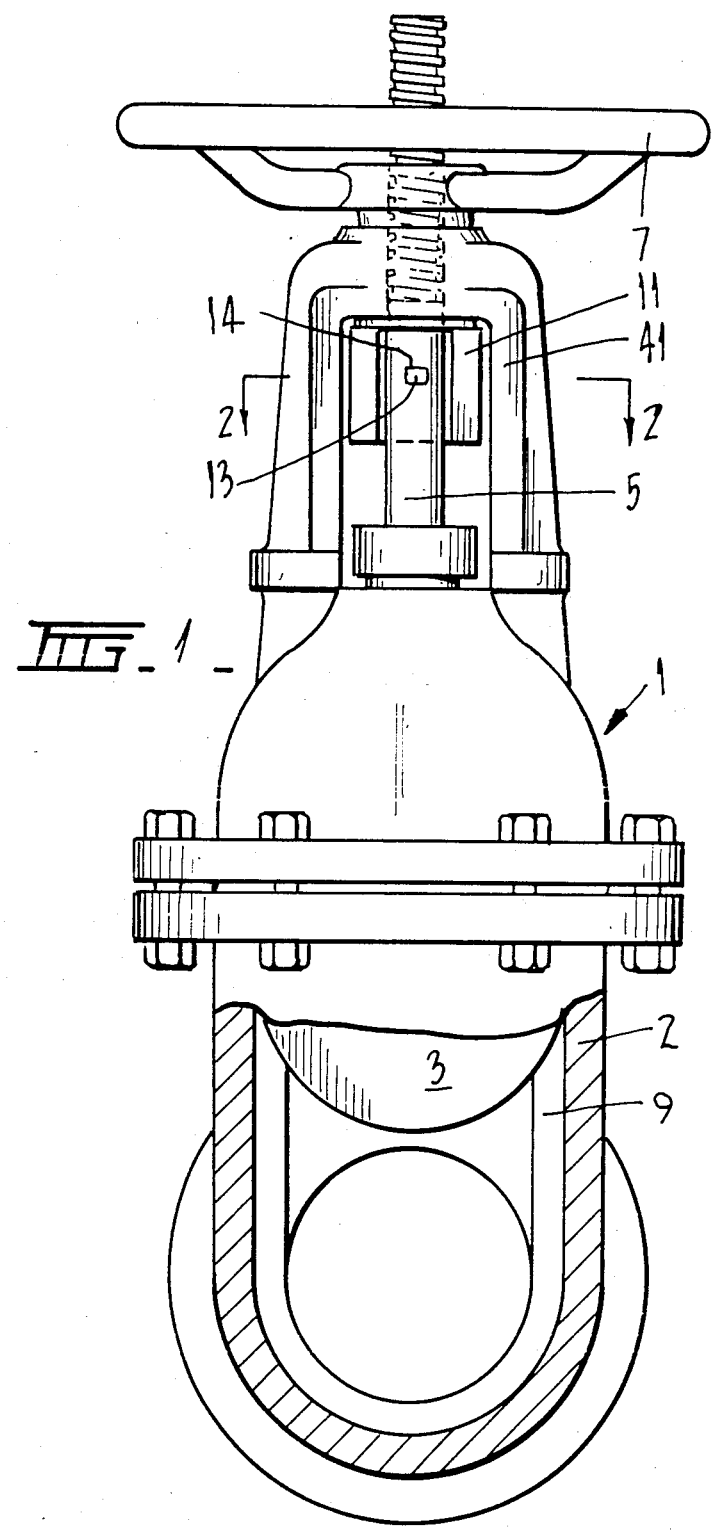
FIG_1

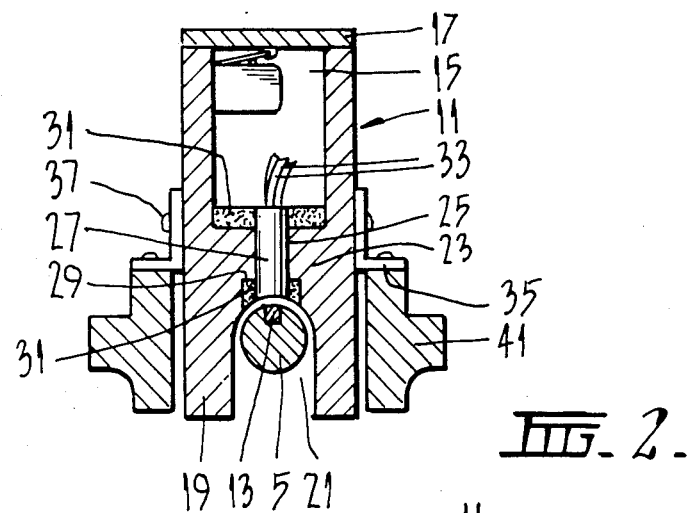
FIG_2.
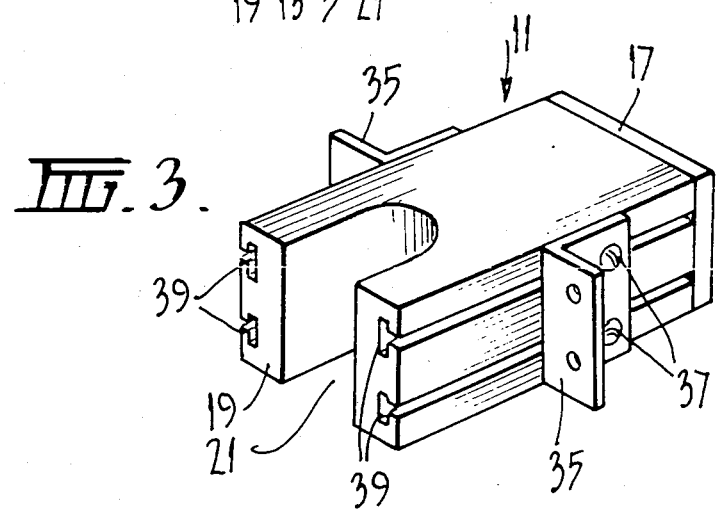
FIG_3.
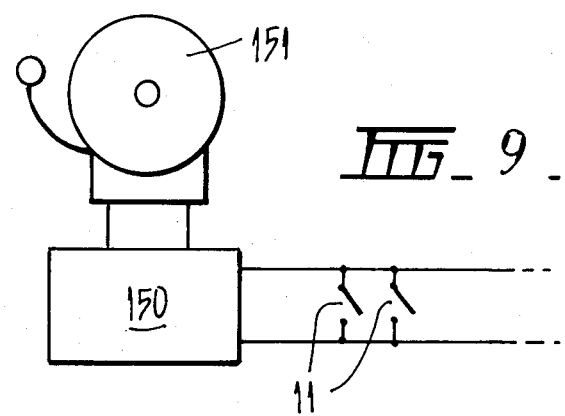
FIG_9.

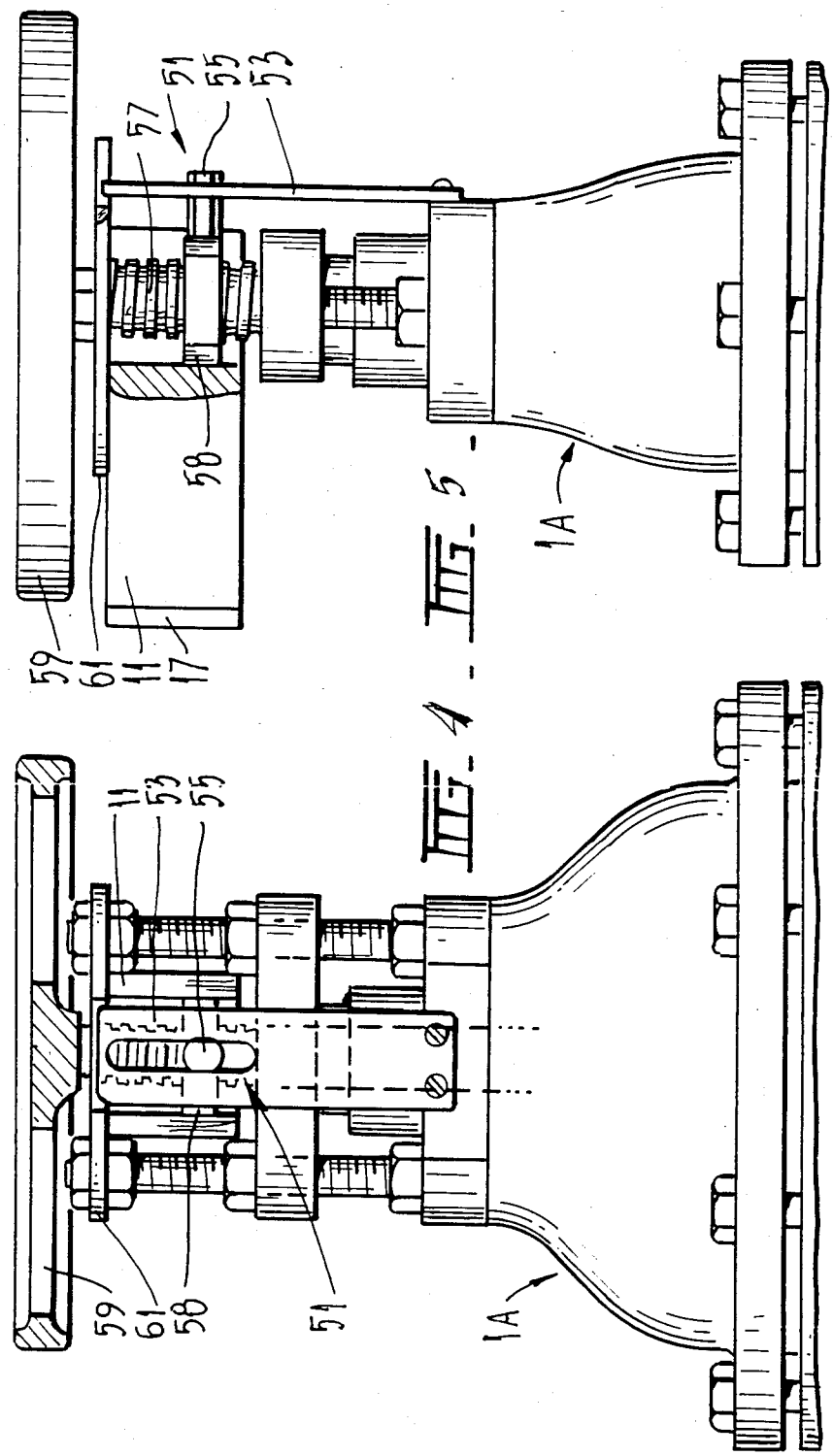

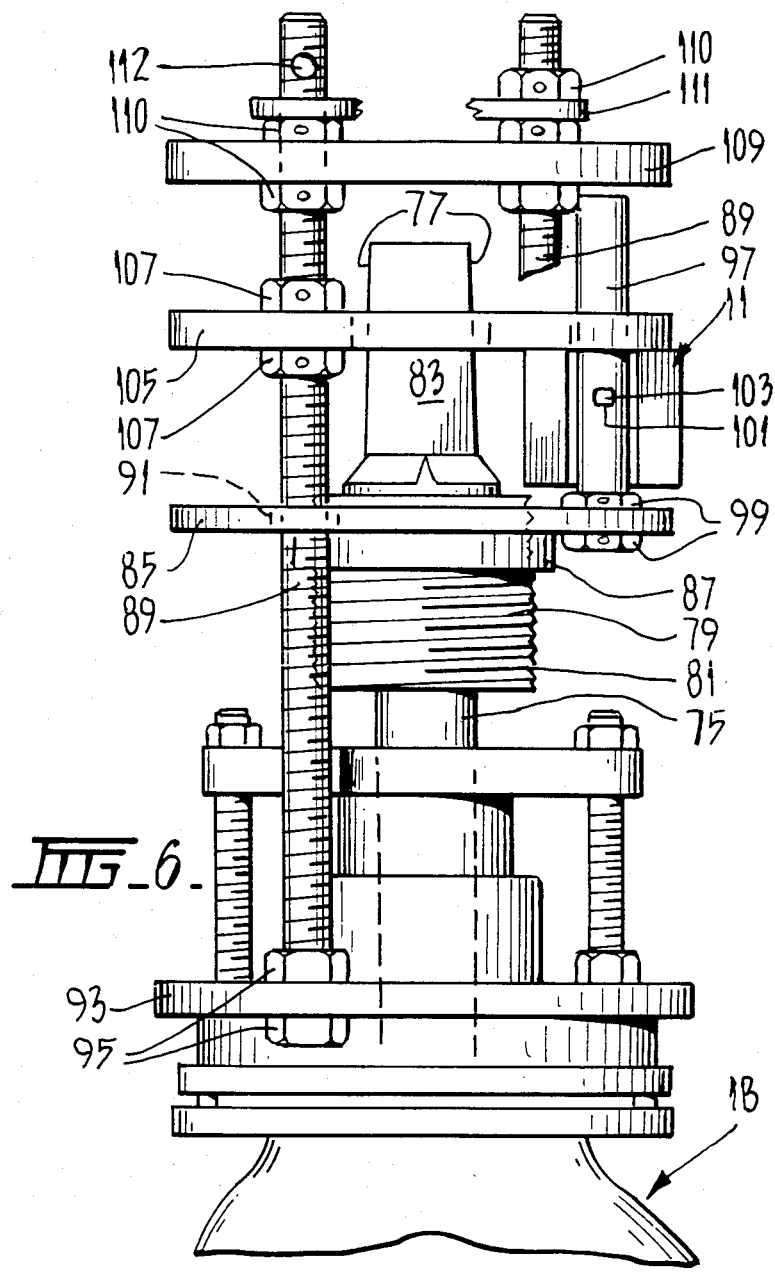

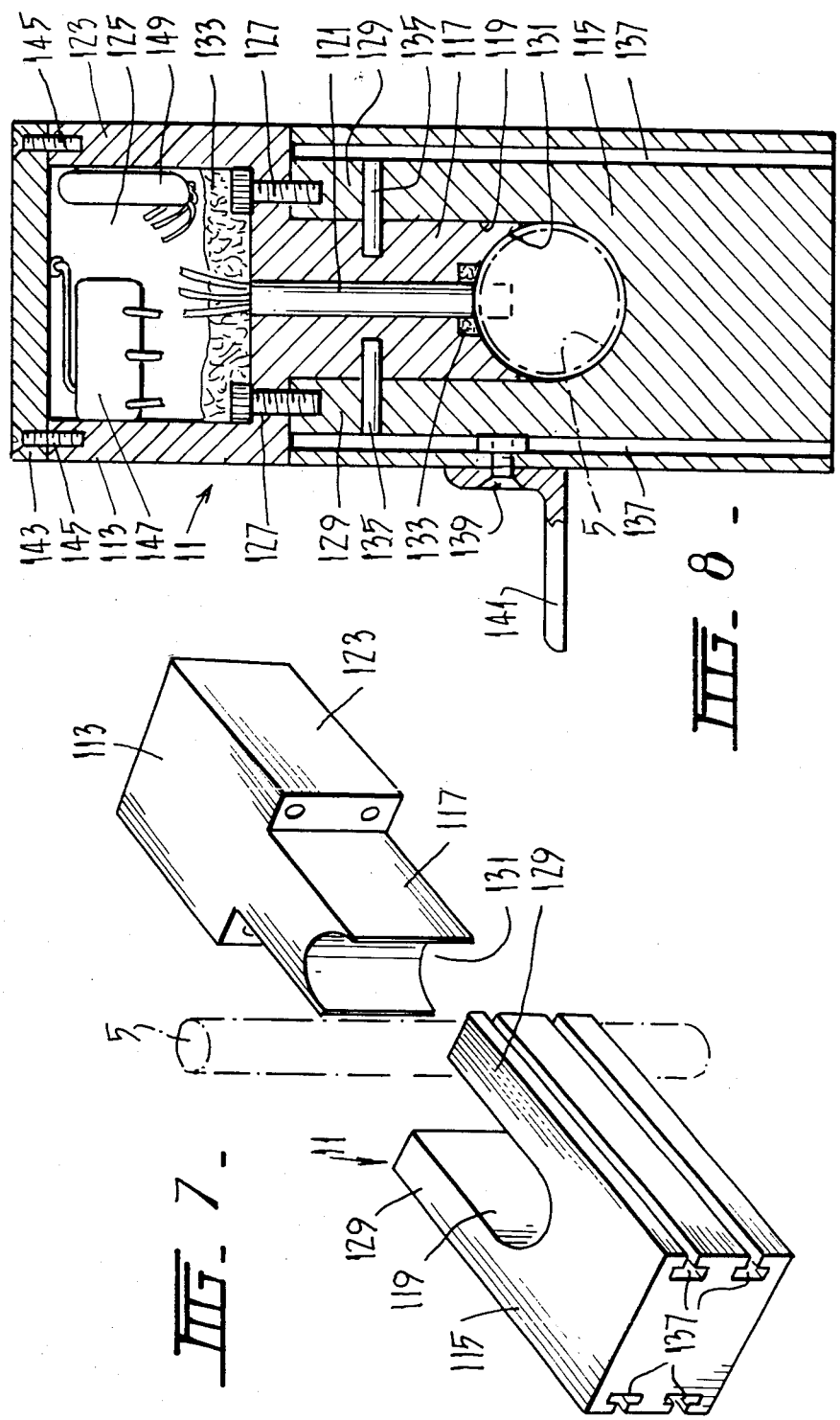

SENSING OF FIRE INSTALLATION WATER VALVES BEING CLOSED

This invention relates to sensing fire installation water valves being closed.

In the art of fire alarm installations such as sprinkler installations, it is normal that there be a plurality of gate valves or the like valves in the water supply lines to sprinklers or like extinguishing devices. During service of such fire installations, it is normal to close the valves and occasionally the valves are accidentally left closed which can have disastrous consequences if there is a fire. Additionally, the valves can be accidentally closed by non-experienced personnel working at the fire alarm installation. i.e. the valves can be left partly closed and not fully open or they can be left full closed. Additionally the valves can be full closed with malicious intent i.e. to inhibit the flow of water should there be a fire.

Hitherto, it has been proposed, to sense when the valves are closed and to cause an alarm to be triggered thereby alerting personnel to the danger. The valves have been sensed closed by inserting a magnetically operable switch within the valve chamber of the main body of the valve, so that it can sense when the gate of the valve is not in the fully open position. A problem with such installations is that the housing from which the valve is made must be drilled so that a suitable sensing element can be placed into the valve chamber. Apart from the problem of sealing such opening to prevent the escape of water therefrom, there is a further problem that because such sensing elements are magnetically operable, they attract metal objects and it is well known that normal town water can often contain a large amount of metal particles. Accordingly, after a period of time, metal particles accumulate around the sensor, and even if the valve is shut, the presence of such magnetic particles prevents the sensors from giving an indication that the valve is closed. Additionally, said sensing elements are inherently difficult to install by reason of the requirement to bleed water from the system prior to installation and the subsequent requirement to effectively seal any holes which may be provided in the valve casings to enable the switches to be fitted. I have discovered that the same object can be achieved by employing a magnetic switch, external of the valve housing which senses movement of some magnetic part of the valve, rather than sensing a closing of the gate of the valve by a sensor in the valve chamber. By sensing movement of the magnetic part it is possible to modify an existing installation without the need to drain the water therefrom. Further, the installation, when completed, is not affected by the presence of any metal particles which maybe in the town water and further the system is not difficult to install.

Accordingly one aspect of the present invention may reside in a method of sensing when a water supply valve is closed in a fire installation, said water supply valve being of the type which normally allows water to flow in the event of fire, said method comprising placing a magnetically operable sensor, externally of the valve chamber and in proximity to a magnetic part associated with said water supply valve, said magnetic part being moveable as the valve gate of said valve is opened or closed, and arranging for said magnetically operable sensor to sense when the valve gate is closed and to trigger an alarm.

According to a further aspect of the present invention there may be provided an improved water supply valve for a fire installation where water is to be supplied through said water supply valve in the event of fire, said valve including a sensor external of the valve chamber which can magnetically sense the gate of the valve being closed and being usable to provide an alarm activating output signal therefrom in such circumstances, said sensor being, in use, connectable to a fire installation to give an alarm indication in response to said output signal when the gate is closed.

According to a further aspect of the present invention there may be provided a fire installation having a magnetically operable sensor fitted to a water supply gate valve thereof externally of the valve chamber, so as to in use, sense the valve gate being closed, whereby to permit an alarm indication to be given when the valve gate is closed.

Most preferably the sensor is a magnetically operable switch which does not require power to be supplied thereto to place said switch into a magnetically sensing condition. The switch is typically a reed switch which does not require any electrical power to place it in a magnetically sensing condition. Typically however, electrical supply will be required to sense opening and/or closing of the contacts.

In one embodiment the sensor senses the absence of some highly magnetic material from the sensor. In other words when the valve is open the highly magnetic material is in proximity to the sensor and when the valve is closed it is removed from the proximity of the sensor. This, in turn, causes the sensor to operate so that an alarm can be triggered.

In order that the invention can be more clearly ascertained several embodiments will now be described with reference to the accompanying drawings wherein;

FIG. 1, is an end view of a typical gate valve which incorporates a sensor arrangement in accordance with the present invention;

FIG. 2 is a sectional view along line 2—2 of FIG. 1;

FIG. 3 is a top perspective view of the sensor shown in FIG. 2;

FIG. 4 is a close-up side view of a further valve of different construction and incorporating a sensor in accordance with the present invention;

FIG. 5 is an end view of the valve and sensor shown in FIG. 4;

FIG. 6 is a close-up side view of an even further valve of different construction incorporating a sensor in accordance with the present invention;

FIG. 7 is a top perspective-partly exploded-view of a different sensor.

FIG. 8 is a sectional plan view of the sensor shown in FIG. 7 but where it is assembled together.

FIG. 9 is a block schematic electrical circuit diagram of a typical fire alarm control installation incorporating features of the present invention.

Referring now to FIG. 1, there is shown a gate valve 1 which has a valve gate 3 therein. The valve gate 3 connects with a threaded valve stem 5 of brass or bronze which, in turn, is operatively connected with a threaded handle 7. Rotation of the handle 7 causes the valve stem 5 to extend or retract to thereby move the gate 3 up and down within guides 9 in the valve body 2 to open and/or close the gate valve. In this embodiment, sensor 11 comprising a magnetic switch in the form of reed switch is attached to the outside of the valve housing, but at a position where it can sense movement of the valve stem 5. This, in turn, is sensing if the gate 3 is closed. The sensor 11 is such that it cooperates with a magnetic material 13 which is fitted within a hole 14 drilled into the valve stem 5. The sensor 11 is such that it is not put into an alarm condition by the presence of the magnetic material 3, but by the absence of the magnetic material 13. In this gate 3 open condition, the electrical contacts in the sensor 11 are open. When the gate 3 is closed, the contacts close thereby providing a signal which can cause an alarm signal to be generated. Typically the magnetic material 13 may be a block of mild steel which is inserted into the hole 14. Alternatively, it may be a permanent magnet which is inserted into the hole 14. The nature of the magnetic material depends on the nature of the sensor 11 but when the sensor 11 is a reed switch, it may have its own magnets associated with it, in which case the magnetic material can be a mild steel or some other highly ferromagnetic material. If the reed switch does not have magnets associated with it, then it may comprise a permanent magnet fitted in the hole 14.

In the embodiment shown in FIG. 1, the magnetic material 13 comprises a permanent magnet. The sensor 11 includes a reed switch which does not have permanent magnets associated therewith to bias it into one of its operative states. The reed switch is such that the switch is normally open when the magnet 13 is in proximity thereof, but wherein the contacts close if the permanent magnet 13 is moved therefrom. In other words, when the gate 3 is moved to the closed position the magnetic material 13 moves away from the reed switch and causes a signal to be generated by the reed switch which can be sensed to, in turn, cause an alarm to be activated.

Referring now to FIGS. 2 and 3, there is shown a typical form of sensor for use in the valve shown in FIG. 1. The sensor 11 comprises a cast iron casting of generally hollow rectangular configuration. The casting has a hollow rear end 15 which is closed by a cast iron lid 17. The lid 17 is fastened to the casting body by means of screws (not shown). The forward end 19 of the sensor 11 has a U-shaped cut-out 21 produced therein. The purpose of the U-shaped cut-out will be explained in due course. A central portion 23 of the sensor 11 has an aperture 25 therein in which is received a reed switch 27. Typically the reed switch 27 is encased in glass and the aperture 25 is of a diameter which enables the glass body of the reed switch 27 to neatly slide therein. The end of the aperture 25 adjacent the forward end 19 of the sensor 11 is provided with a larger diameter aperture 29. The larger diameter aperture 29 is in fact a bore of larger diameter than that of the aperture 25. The reed switch 27 is fitted within the aperture 25 so that one end of the reed switch 27 locates flush with the bottom surface of the U-shaped cut out 21. Epoxy resin is back filled into the hollow end 15 and into the larger diameter aperture 29. Thus the epoxy resin 31 suitably bonds and locates the reed switch 27 in the body of the sensor 11. Three leads 33 extend from the reed switch 27 and pass out through the hollow end 15 through a suitable aperture (not shown). The reed switch 27 has three leads so that normally open and or, normally closed contacts can be selected as required for particular installations. This will be explained later. The sensor 11 is mounted onto the valve 1 by means of angle brackets 35 which are bolted to the sides of the housing of the sensor 11, by means of bolts 37, the heads of which locate in T-shaped slots which extend along the sides of the housing of the sensor 11. The angle brackets 35 are positioned on the housing of the sensor 11 at a suitable location so that, in use, the housing of the sensor 11 can be mounted to parts 41 of the valve body. The position of mounting is such so that the end of the reed switch 27 which is at the forward end 19 of the sensor 11 is in very close proximity to the circumferential surface of the valve stem 5 of the valve 1. The diameter of the curved portion of the U-shaped cut-out 21 is marginally larger than the diameter of the valve stem 5. The effect of the U-shaped cut-out 21 in the body of the housing of the sensor 11 is to provide a bulky area of highly ferrous material surrounding the reed switch 27 and the valve stem 5. The reason for this is to avoid against attempting to hold the contacts of the reed switch in the non-alarm condition by placing a large magnet close to the sensor 11. In this case, the bulk of the body of the housing of the sensor 11 serves to contain any magnetic flux which would eminate from, such magnets. Thus, the reed switch 27 will still provide an alarm signal if the valve is moved to the closed position.

FIGS. 4 and 5 show a further alternative embodiment where a different type valve is used. Here, the valve body 1A has an indicator 51 attached thereto. The indicator 51 includes a scale 53 on which gate open and closed positions are marked. (These have not been shown in order that the figures will remain uncluttered). The scale 51 carries a pointer 55 which is operatively connected with the threaded brass stem 57 via a threaded collar 58 so as to slide up and down the stem 57 as the stem 57 is rotated by the handle 59 to open and/or close the gate in the body 1A. Thus, depending on the position of the gate within the body 1A then the pointer 55 will assume a position on the scale 53 to show the amount of opening and/or closing of the gate of the valve. In adapting the principles of the present invention to this type of gate valve, a sensor 11 is attached to the indicator 51 so as to sense the position of the collar 58 of the pointer 55. Accordingly, when the collar 58 of the pointer 55, which is a highly ferro magnetic material moves to the gate closed position, then the sensor 11 operates to provide an alarm signal. The collar is typically of cast iron or mild steel. In this embodiment the sensor 11 is of the same construction as in the previous embodiment except that it is biased by permanent magnets to be in the switch open condition when the collar 58 is in the gate open position. Thus, when the gate is closed, the collar 58 moves away from the sensor 11 and thus the reed switch therein trips to the closed position thereby providing a signal which can be used to trigger an alarm. The sensor 11 is fastened by means of bolts (not shown) to an upper flange part 61 of the mounting of the scale 53.

If desired the collar 58 could be of brass with a permanent magnetic insert in it. In this case there would be no need to bias the reed switch with permanent magnets to be in the normally open condition.

In the embodiment shown in FIG. 6 a different type of gate valve is shown where the valve body 1B does not have a rotatable handle thereon. Instead this valve has a rotatable valve stem 75 which has an upper extension 79 fitted thereto which, in turn, has a pair of opposed flats 77 at the top thereof. The pair of opposed flats 77 can be engaged by a spanner or key to cause rotation of the stem 75 to open and/or close the valve. In this embodiment, the valve stem 75 and the extension 79 are typically made from mild steel. A brass sleeve 81, which is externally screw threaded is fitted to the lower most end of the extension 79 and pinned thereto by a pin (not shown).

The sleeve 81 carries a screw threaded nonrotatable plate 85. The plate 85 has a central boss 87, which is internally screw-threaded so as to engage with the screw thread on the sleeve 81. The plate 85 is inhibited from it rotation by clamping rods 89 (only two of which are shown in the drawings) which pass through suitable openings 91 in the plate 85. The clamping rods 89 are screw-threaded and clamped to an upper part 93 at the top of the valve body 1B by means of a pair of nuts 95. Typically, there are four such clamping rods 89 around the circumferential extent of the top of the upper part 93 of the valve body 1B.

As the extension 79 is rotated, then the stem 75 is rotated and simultaneously the sleeve 81 of the extension 79 is also rotated. Because the plate 85 is screw-threaded to the sleeve 81, then the plate 85 moves upwardly and downwardly along the screw-threaded sleeve 81 of the extension 79.

The plate 85 carries a brass rod 97 at one side thereof. The brass rod is held to the plate 85 by a pair of nuts 99 which are screw-threaded onto the brass rod 97. The brass rod 97, in turn, has a hole 101 drilled therein transversely of the longitudinal axis thereof and the hole 101 carries a piece of highly magnetic material 103. Preferably the highly magnetic material 103 is a permanent magnet, but it may be some other material as discussed previously. Sensor 11 is placed to co-operate with the magnetic material 103 and in this connection the sensor 11 is carried on a plate 105 which, in turn, is held to the clamping rods 89 by nuts 107. The rod 97, in turn, passes through a suitable open (not shown) in the plate 105. Accordingly, as the plate 85 moves up and down the sleeve 81 of the upper part 83 as the valve stem 75 is rotated, then the rod 97 moves up and down therewith and displaces the magnetic material 103 from the sensor 11. This, in turn, causes operation of the switch contacts in the sensor 11 so that an alarm can be given if the valve gate moves to the closed position. The sensor 11 is of the same type as shown in the previous embodiments.

The rods 89 carry an annular plate 109 which is held thereto by locking nuts 110. The annular plate 109 is held above the top of the extension 79 and at a position such that it physically protects the sensor11 but permits access to the extension 83 for operation of the valve.

A plate 111 extends between two clamping rods 89. The plate 111 is held to one of the rods 89 by one of the locking nuts 110 and to the other by means of a padlock (not shown) which passes through aperture 112 in that rod 89. All the nuts can be pinned by pins (not shown) so that the alignment of the sensor 11 with the rod 97 and magnet 103, will be easily upsettable.

In FIGS. 7 and 8, a different form of sensor 11 is shown. In this embodiment, the sensor 11 is made of two parts of cast iron which can be interconnected to completely surround the valve stem 5 or some other part of the valve which is integrally connected with the gate therein. In this embodiment the electrical switches are housed in a generally T-shaped part 113. The T-shaped part 113 co-operates with a shield part 115 by having the stem 117 located within a U-shaped cut-out 119. The parts 113 and 115 may be made of material other than cast iron such as brass and or plastics, but the choice of a highly magnetic material such as cast iron is desirable as it will act to contain the field of any magnets which are brought within proximity to the external surfaces of the parts 113 and 117 and thereby effectively provide a shield around the reed switch 121 which is mounted in the part 113. Accordingly, the reed switch 121 will be unlikely to be influenced by external magnetic fields which may be brought into proximity of the sensor 11, simply to try to hold the contacts of the reed switch 121 open by persons wishing to close the gate valve without causing an alarm signal to be given. If the parts 113 and 115 are made of other material such as plastic and or brass, then the physical size of the parts 113 and 115 will have to be substantial as it is simply the distance from the external surfaces of those parts 113 and 115 which renders the field of any external magnets relatively weak at the position of the reed switch 121.

The reed switch 121 is mounted within the stem 117 of the part 113 in a manner identical to that described in the previous embodiment. In the head 123 of part 113, there is a hollow recess 125 through which screws 127 can be passed to engage with the arms 129 of part 115, whereby to screw fasten the parts 113 and 115 together. Typically four screws are provided in the corners of the hollow recess 125. It can be observed that the lower most end of the stem 117 contains a semicircular face 131; this is shown clearly in both FIGS. 7 and 8. When the part 113 is assembled with the part 115, then a circular opening is provided which is of only slightly larger diameter than the external diameter of the shaft 5. Accordingly, the shaft can either rotate and or move upwardly and downwardly within that opening and move the magnetic material 13, 103 to or from proximity of the reed switch 121.

It can be seen that the forward end of the reed switch 121 comprises a back-fill of resin 133 and that the hollow recess 125 also contains a back-fill of resin 133. The back-fill of resin 133 in the hollow recess 125 covers the heads of the screws 127 to thereby conceal and make difficult the removal of part 113 from part 115. It can also be observed from FIG. 8 that pins 135 extend inwardly of the sides of the sensor 11 and pass through the arms 129 into the stem 117. The pins 135 thereby provide an additional locking means to inhibit removal of parts 113 and 115 from each other. The pins 135 are inserted through the longitudinal slots 137 which extend along the side edges of part 115, which slots 137 are used for holding the heads and or nuts of captive screws and bolts 139, which are used to mount brackets 141 to the sensor 11 so that the sensor 11 can, in turn, be mounted to the valve at an appropriate operative position. The tops of the pins 135 are positioned inwardly relative to the innermost surfaces of the slots 137 and therefore the pins 135 do not interfere with sliding movement of the heads of the screws or bolts or nuts which slide within the slots 137.

The hollow recess 125 is closed by a lid 143 which, in turn, is screw-fastened to part 113 by screws 145. Mounted within the hollow recess 125 is a microswitch 147 which is arranged so that the moving arm thereof engages and is depressed by the lid 143 when the lid 143 fully closes the hollow recess 125. The microswitch 147 is provided as a security means to signal an alarm if the lid 143 is removed. A further proximity switch in the form of a reed switch 149 is also mounted within the hollow recess 125 and is provided to give an alarm signal if a magnetic field comes into proximity of the sensor 11. This would occur if a person were attempting to place a magnet near the sensor 11, maliciously wishing to "fool" the sensor 11 by attempting to hold the contacts of the reed switch 121 open when the valve gate is closed.

Each of the switches 121, 147 and 149 have three leads extending therefrom. These leads are respectively the common lead, the normally open lead, and the normally closed lead which connect with the respective contacts within those switches. The respective contacts of all of these three switches may be connected in parallel so that activation of any one of the switches will cause an alarm signal to be given. Depending on the circuit configuration required the switches may also be in series or may be connected in a combination of series and parallel configurations.

In the embodiment shown in FIGS. 7 and 8, it will be extremely difficult for a person to attempt to place a highly magnetic material down between the valve stem 5 and the surfaces 131 of part 117 to attempt to "fool" the reed switch 121 i.e. to maintain the contacts open even when the valve gate is closed.

By observing FIG. 9 it can be seen that a conventional sprinkler fire alarm control circuit 150 is operatively connected to a bell 151 or other suitable indicating means. The bell 151 may be at the actual location of the fire alarm installation and/or it may be at an actual fire brigade station. The switch contacts of the various sensors 11 are shown operatively connected in parallel and of the type which close to provide an electrical alarm signal. Alternatively the circuitry may be arranged to give an electrical alarm signal if the contacts of the sensors 11 open. In this alternative embodiment the contacts of the sensors 11 will be closed when the valve is fully open and would open when the valve gate moves to the closed position.

It should be appreciated that many modifications can be made to the present invention without departing from the scope thereof. For example the sensors need not be reed switches but any suitable magnetic switches. It is appreciated that with the present invention the actual switch is not within the valve chamber so as to be in the actual water, and hence there is a distinct advantage over the valves of the prior art which have been fitted with sensing means to sense the closed position.

These and other modifications may be made without departing from the ambit of the invention, the nature of which is to be determined from the foregoing description.

I claim:

1. A method of modifying a water supply gate valve for a fire installation so that said valve can provide an alarm when said valve is closed, said method comprising:
   (a) attaching appropriate magnetic material to a part of said valve which moves when the gate of said valve moves;
   (b) fixedly mounting a first magnetically operable sensor relative to said vlave, externally of a valve chamber of said valve, wherein said first sensor is mounted in a housing and wherein said housing includes a second sensor for sensing if a lid of said housing is opened; and
   (c) connecting a signal emitting alarm to said first sensor, said mounting of said first sensor being at a positon where it will cooperate with said appropriate magnetic material such that when said valve is open, no signal will be emitted but when said valve is closed, a signal will be emitted, said first sensor being of the type which does not require power to be supplied thereto to place it into a magnetic sensing condition for use.

2. A method of modifying a water supply gate valve for a fire installation so that said valve can provide an alarm when said valve is closed, said method comprising:
   (a) attaching appropriate magnetic material to a part of said valve which moves when the gate of said valve moves;
   (b) fixedly mounting a first magnetically operable sensor relative to said valve, externally of a valve chamber of said valve, wherein said first sensor is mounted in a housing and wherein said housing includes a second sensor for sensing if magnetic material is brought into proximity of said second sensor in an attempt to "fool" said second sensor from providing said alarm if said valve is closed; and
   (c) connecting a signal emitting alarm to said first sensor, said mounting of said first sensor being at a position where it will cooperate with said appropriate magnetic material such that when said valve is open, no signal will be emitted but when said valve is closed, a signal will be emitted, said first sensor being of the type which does not require power to be supplied thereto to place it into a magnetic sensing condition for use.

3. A modified water supply valve as claimed in claim 2, wherein said second sensor is a reed switch.

4. A method of modifying a water supply valve for a fire installation for permitting an alarm to be given if said water supply valve is closed, said method comprising:
   (a) providing a hole in a valve shaft of said water supply valve;
   (b) fitting appropriate magnetic material in said hole;
   (c) fixedly mounting a first magnetically operable sensor relative to said water supply valve, externally of a valve chamber of said water supply valve, wherein said first sensor is mounted in a housing and wherein said housing includes a second sensor for sensing if a lid of said housing is opened;
   (d) connecting an alarm to said first magnetically operable sensor; and
   (e) permitting signal to be given from said alarm if said water supply valve is closed, said water supply valve being of the type where the valve shaft thereof moves in and out of said water supply valve as said water supply valve is closed and opening, said mounting of said first sensor being at a position where it will cooperate with said appropriate magnetic material such that when said water supply valve is open, no signal will be given but when said water supply valve is closed, a signal will be given, said first magnetically operable sensor being of the type which does not require power to be supplied thereto to place it into a magnetic sensing condition for use.

5. A method of modifying a water supply valve for a fire installation for permitting an alarm to be given if said water supply valve is closed, said method comprising:
   (a) providing a hole in a valve shaft of said water supply valve;
   (b) fitting appropriate magnetic material in said hole;
   (c) fixedly mounting a first magnetically operable sensor relative to said water supply valve, externally of a valve chamber of said water supply valve, wherein said first sensor is mounted in a housing and wherein said housing includes a second sensor for sensing if magnetic material is brought into proximity of said second sensor in an attempt to "fool" said second sensor from providing said alarm if said valve is closed;

(d) connecting an alarm to said first magnetically operable sensor; and (e) permitting a signal to be given from said alarm if said water supply valve is closed, said water supply valve being of the type where the valve shaft thereof moves in and out of said water supply valve as said water supply valve is closed and opened, said mounting of said first sensor being at a position where it will cooperate with said appropriate magnetic material such that when said water supply valve is open, no signal will be given but when said water supply valve is closed, a signal will be given, said first magnetically operable sensor being of the type which does not require power to be supplied thereto to place it into a magnetic sensing condition for use.

6. A modified water supply valve as claimed in claim 5, wherein said second sensor is a reed switch.

* * * * *